Oct. 24, 1967 V. E. WEISS 3,348,950

SNACK PRODUCT AND PROCESS

Filed June 25, 1964

| INGREDIENTS — PART 1 | INGREDIENTS — PART 2 |
|---|---|
| YELLOW CORN GRITS 25 LBS. | SUCROSE ................................ 1 LB. |
| WATER ........................... 4 LBS. | SALT (NaCL) ..................... 0.7 LBS. |
| SODIUM BICARBONATE 65 GRAMS | WATER ............................... 3 LBS. |

↓

MIXING WATER & SODIUM BICARBONATE AND BLENDING THE RESULTING SOLUTION WITH GRITS

↓

STEEPING PERIOD OF 1/2 HOUR OR MORE

↓ ← ADD INGREDIENTS OF PART 2

COOKING THE MIXTURE OF PARTS 1 & 2

↓

COOLING THE RESULTING DOUGH

↓

SHEETING THE DOUGH AND FORMING THE SAME INTO PIECES

↓

DRYING THE PIECES AT 140° F TO 12% MOISTURE

↓

TEMPERING PERIOD

↓

DEEP FAT FRYING

↓

END PRODUCT

INVENTOR.
VERNE E. WEISS

BY *Robert B. Hughes*

ATTORNEY

United States Patent Office 3,348,950
Patented Oct. 24, 1967

3,348,950
SNACK PRODUCT AND PROCESS
Verne E. Weiss, Minneapolis, Minn., assignor to General Mills, Inc., a corporation of Delaware
Filed June 25, 1964, Ser. No. 377,858
18 Claims. (Cl. 99—80)

ABSTRACT OF THE DISCLOSURE

A food product formed of corn grits, sucrose, water, and a selected group of alkaline salts. The ingredients are combined to form a mixture, and a series of acts are performed on the mixture so that a food product having a new and distinctive taste is obtained.

---

This invention relates to a new and improved food product and method for making the same, which food product can be properly categorized as a "corn snack."

The food products which are sold in the general category of snack items are many and varied, including such things as chips (e.g. potato chips, corn chips), puffs (e.g. corn puffs), etcetera, and they account for a large dollar volume in the food industry. Generally these are eaten apart from a regular meal, for example, as party snacks or as appetizers, either with or without spreads or fillings, or the like. Often different snack items are served at the same time, perhaps in different snack dishes or in an hors d'oeuvre tray presenting a variety of these and other food items for the choice of the guests or customers.

It seems that the particular appeal of these snack items lies largely in their tastiness or savoriness. People do not look to gain a great deal of their day's nourishment from snacks, nor do they expect, nor want to be, filled by them. Rather a person likes to find an especially inviting flavor that temporarily appeases, but then whets the appetite and sharpens the taste. Thus a person will often sample the snacks, leisurely savoring them, comparing the taste, and eventually centering his choice on one or more preferred snacks. With the consumer public regarding these so discriminatingly, commercial success of a snack seems to depend quite largely on whether people find in it a particularly delectable taste.

In view of this, considerable work has been done not only in refining and maintaining good quality control of the flavor and other characteristics of snack items, but also creative effort has been directed toward making snack items that are new and distinctive with regard to tastiness or savoriness. Success in achieving the latter is difficult to come by. Most "acceptable" tastes in snack products have come to be regarded by most people as familiar or commonplace in that these tastes are similar to those found in other related food products. When a taste is achieved that is distinctive, that has a character of its own, it is too often regarded with less than wholehearted approval and may meet with such comments as "a little too sweet" or "slightly bitter," "a little caustic," or "too strong," all of these phrases expressing a mild disapproval, which in the snack field especially might be called calamitous.

Even when a new and desirable quality is achieved in a product, there are problems in translating this into a commercially acceptable product. The product must lend itself to suitable quality control and to practical production techniques; also the product must have a sufficiently long "shelf-life" in that it must maintain its quality over a period of time.

Corn snacks (i.e. snack items made from corn) have proven over the years to be a popular class of food products, and there have been various improvements in making the same. For example, some time ago it was found that a desirable corn snack could be made from corn that is steeped in calcium hydroxide for a period ranging from 18 to 24 hours, to give the product the limed flavor that has traditionally been associated with corn masa dough. While various improvements have been made in effecting this strongly alkaline treatment and in other aspects of the overall process, the desired limed or corn masa character of this type of corn snack has in general been maintained.

Although the quality of such prior art corn snacks is recognized, it is still, as it has been for many years, a desired end to create a corn snack which would be new and distinctive, particularly with regard to its taste.

Hence it is a general object of the present invention to provide such a corn snack product and a method of making the same, which product is particularly characterized in that its general taste or flavor is new and distinctive, and yet the product is highly delectable and generally quite desirable.

To indicate generally the nature of the present invention, it has been found that by utilizing, as ingredients, corn, water and sucrose, and in addition to these utilizing as a flavor developing ingredient either $NaHCO_3$, $KHCO_3$, $Na_2CO_3$, $K_2CO_3$, $Na_3PO_4$, or combinations thereof, a distinctive and delectable corn snack product of high overall quality can be achieved when these ingredients are processed as described hereinafter. The process by which the product of this invention is produced can be summarized generally as follows:

(1) Combining corn grits, water, sucrose, and the flavor developing ingredient, i.e. $NaHCO_3$, $KHCO_3$, $Na_2CO_3$, $K_2CO_3$, $Na_3PO_4$, or combinations thereof. (For best results, this is done by first dissolving the flavor developing ingredient in part of the water, mixing the resulting solution with the corn grits and permitting the mixture to stand for a half hour or more, this being a "steeping period," and then adding the sucrose and the rest of the water);

(2) Cooking these ingredients until a gelatinized dough is formed;

(3) Forming this dough into pieces of the desired shape for the end product;

(4) Drying and tempering these dough pieces;

(5) Deep frying these dried and tempered dough pieces to produce the end product.

With regard to the problems of putting this invention into actual practice it may be stated as a further object to provide such a product and process which are, for a large scale commercial operation, practical and generally advantageous with regard to the production techniques and the other considerations involved in a commercial operation. To particularize with regard to some of the things which contribute to such practicality and advantageousness, the following factors are noted. In the process of making this new corn snack, no excess water is used, and hence there is no product loss in washing or draining, as in the case of at least some of the prior art processes relating to corn snacks. Also corn grits can be quite advantageously used instead of whole corn, this resulting in a more practical commercial operation. At one stage of this process, a gelatinized workable dough is provided which can, with relative ease, be shaped into various forms which may be desired for the configuration of the end product snack pieces. At a later stage of the process, the moisture content of the snack pieces is, immediately prior to frying, low in comparison with at least some other corn snack processes; thus there is a relatively short frying time of the snack pieces, and further there is substantially no blistering or other such undesirable features in the end product. In general, it will be noted that the mechanics of the process of the present invention are in part similar to well established production techniques used for ready-to-eat breakfast cereals, and hence many of the problems which could otherwise arise in putting such an invention into practical operation are alleviated.

Thus, it is an object or objects of the present invention to accomplish the various factors recited in the immediately preceding paragraph.

These and other objects and features of the invention will be more readily understood and appreciated from the following detailed description of the preferred embodiment thereof selected for purposes of illustration and shown in the accompanying drawing, in which:

FIGURE 1 is a schematic drawing showing in some detail a preferred embodiment of the present invention.

It is believed a clearer understanding of the present invention will be attained if what is believed to be the general nature of this invention is discussed to some extent before disclosing the particular ingredient formulas and processing conditions which have been found to be most advantageous. Although the exact nature of the various chemical reactions which occur throughout the process would be extremely difficult to ascertain with any great precision, the following can be hypothesized with some justification as to the general nature of these reactions.

The more significant chemical reactions which take place in this process are properly classified as browning reactions. The sugar (i.e. sucrose) and the corn (probably to a lesser extent than the sugar) supply the proper raw material for browning reactions in the process. The alkaline salt (i.e. sodium bicarbonate or the other salts specified above as a flavor developing ingredient) serves both to accelerate browning reactions in the product during the drying process and to qualitatively control these browning reactions. As is generally well known, browning reactions are very complex and a host of different products may be formed from sucrose alone, depending upon conditions used. The alkaline pH used in the cooking and drying process in the presence of a sugar accelerate browing reactions so that quantitatively browning is adequate during the cooking and drying steps to form flavor precursors in sufficient amounts. However the use of sucrose as sugar and the use of sodium bicarbonate (or the other salts specified) as the alkaline salt, are necessary in order to qualitatively control the reaction so that proper and desirable flavor precursors are obtained. Use of sugar other than sucrose or of alkaline salts other than those specified herein does not result in what might be described as the particular sweet, nutty, mildly toasted desirable flavor that is produced, when in the final step of deep fat frying the flavor precursors are converted into the final flavored compounds of the end product.

It is to be noted that an acidulent is not used as an ingredient with the sodium bicarbonate to produce the effect of a leavening agent. As will be indicated hereinafter, some amount of acids will be developed during the process, and very probably there will be some reaction of these acids with the sodium bicarbonate to release some carbon dioxide which would have a leavening effect. But the main function of the sodium bicarbonate (or the other salts specified herein) is that of a flavor developing ingredient to coact with the sucrose, corn and water in the present process.

The process of the present invention will now be described in more detail.

Ingredients

As previously indicated, the ingredients essential to the process of the present invention are corn, water, sucrose, and a flavor developing agent which is either $NaHCO_3$, $KHCO_3$, $Na_2CO_3$, $K_2CO_3$, $Na_3PO_4$, or combinations thereof. For proper seasoning, table salt (i.e. sodium chloride) is also added, either as one of the initial ingredients, or dusted on at the end of the process, or both.

With regard to the flavor developing agent, it has been found that while any one or combination of $NaHCO_3$, $KHCO_3$, $Na_2CO_3$, $K_2CO_3$ and $Na_3PO_4$ produce a distinctive high quality product, the product achieved by the use of $NaHCO_3$ or $KHCO_3$ is an especially desirable product in that an especially rich flavor is developed. Thus it is preferred to use either or both of these two last mentioned alkaline salts. For various reasons, it is believed most practical in a commercial operation to use sodium bicarbonate ($NaHCO_3$), and so the details of the present process will be explained in terms of the use of sodium bicarbonate, it being understood that potassium bicarbonate or a mixture of potassium bicarbonate and sodium bicarbonate could be used equally well to obtain the most preferred product, and sodium carbonate, potassium carbonate, and/or sodium phosphate could be used with quite satisfactory results, either along with or in place of potassium bicarbonate and/or sodium bicarbonate.

Attempts were made by the present inventor to utilize various salts other than the five salts specified herein as a flavor developing ingredient, but the quality of the end products was definitely inferior to that achieved in the present invention. (For example, using calcium hydroxide according to the processing steps herein produced an end product which did not have a highly desirable flavor for a corn snack item.)

The amount of sodium bicarbonate used can vary within moderate limits. As indicated in the formula of ingredients in FIGURE 1, for 25 pounds of corn grits, 65 grams of sodium bicarbonate would be suitable. The approximate range where a very desirable product can be obtained is between about 50 to about 80–85 grams of sodium bicarbonate, or about 0.6 gram mole to about 1.0 gram mole of sodium bicarbonate for each 25 pounds of corn grits, and satisfactory results can be obtained within a range of about 0.4 to 1.2 gram moles. When too little sodium bicarbonate is used, the end product has a flavor more characteristic of fried corn, rather than the distinctive flavor achieved by the present invention, and when too much sodium bicarbonate is used, the flavor becomes undesirably alkaline. For example, when 112 grams of sodium bicarbonate was tried with 25 pounds of corn grits, the flavor, although somewhat acceptable, was too alkaline, even though sugar was added to a much greater degree than specified in the preferred formula shown in FIGURE 1. (Four pounds of sugar was used in this instance with the 25 pounds of corn grits instead of the one pound specified in the ingredient formula.)

When potassium bicarbonate is used instead of sodium bicarbonate, about the same molar ratio of potassium bicarbonate is used. That is to say, instead of using 65 grams of sodium bicarbonate, 77 grams of potassium bicarbonate is used. Likewise the range within which potassium bicarbonate can be varied to obtain satisfactory results is about 0.4 gram mole to 1.2 gram moles for each 25 pounds of corn grits, this also being the approximate range for sodium carbonate, potassium carbonate, sodium phosphate, and mixtures of these and/or sodium bicarbonate and potassium bicarbonate. However, it was found that when $Na_2CO_3$ was used predominantly as the flavor developing ingredient, optimum results were obtained by utilizing an amount in the lower portion of the range of 0.4 to 1.2 gram moles per 25 pounds of corn grits, and this amount could even go moderately below the 0.4 limit to still obtain a satisfactory product. On the other hand, when $K_2CO_3$ and/or $Na_3PO_4$ was used predominantly, an amount in the higher part of the 0.4 to 1.2 range produced best results, and the amount used could go moderately above the 1.2 limit.

The corn which is used as an ingredient is desirably in the form of grits in preference to whole corn kernels, since the latter are more difficult to wet with the sodium bicarbonate and water solution. Also the hulls of the kernels would cause a roughness of texture of the end product and would also cause poorer appearance, and the germ portions of the kernels could cause some product instability. However, if corn kernels were ground to a meal, this would alleviate to some degree the roughness of texture of the end product.

It is preferred to use corn grits of a fairly uniform size, the approximate optimum size being that at which about half the grits would pass through a U.S. No. 14 screen. If the grits are substantially larger than this, it is more difficult to obtain, during the tempering period, a thorough wetting of the grits, which, if not achieved, will result in non-uniform cooking and a slightly mottled appearance of the end product. On the other hand, if the grits are quite small, they tend to lump more tightly together in the pressure cooking operation, which also presents problems in obtaining uniform cooking, and further makes the handling of the dough in the forming or shaping operation more difficult.

As indicated previously, sucrose is one of the essential ingredients in the process. The amount of sucrose used can be varied within moderate limits, the desired amount being about 1 pound, and the approximate range within which a very desirable product can be obtained being from about ½ lb. to 2 lbs. per 25 pounds of corn grits. With too little sucrose, there is simply not enough of this essential ingredient (i.e. sucrose) to achieve the distinctive flavor of the present invention, while with too much sucrose, the excess of sucrose merely sweetens the end product beyond the optimum condition.

The amount of water used as an initial ingredient may vary to some degree, depending upon several factors, such as the initial moisture content of the corn grits themselves and the particular condition in the pressure cooker. The moisture content of the corn grits will generally be about 12 or 13 percent, based on total weight (this being the assumed moisture content of the grits in the ingredient formulas given in FIGURE 1). Also a certain amount of moisture will be added to the grits when they are in the pressure cooker, this depending somewhat upon the precise conditions in the cooker (e.g., whether wet or saturated steam is used). At any rate, the amount of water added to the grits before cooking and the processing conditions in the pressure cooker should be such that the moisture content of the gelatinized product leaving the pressure cooker be at about 34 to 36 percent, based upon total weight. It is well within the skill of the art of processing cereal products in pressure cookers to determine the amount of water used as an initial ingredient in relation to the conditions in the pressure cooker to achieve this percentage of moisture in the cooked dough after it is taken from the cooker.

*Combining the ingredients*

The initial ingredients for the corn snacks are, as shown in FIGURE 1, considered as being in two parts, since the preferred method of combining the ingredients is to first make a solution of part of the water and sodium bicarbonate and then blending this solution with the grits. The water ratio between the first and second parts of ingredients is not critical. However, the water in the first part should be sufficient to dissolve the sodium bicarbonate so that the sodium bicarbonate can be absorbed in solution well into the corn grits during the steeping period, this being necessary to obtain the best quality in the end product. This blending can be done in any suitable manner so long as the grits become well wetted with the solution.

The corn grits, after being mixed with the water and sodium bicarbonate solution, are permitted to stand at room temperature for a period of about a half hour or more (this being the steeping period). The length of this steeping period is not critical, but the time should be sufficient to permit the corn grits to become well wetted with the sodium bicarbonate solution. In a commerical operation there is no particular advantage or saving in attempting to have the shortest possible steeping period, and a steeping period of about forty-five minutes or an hour has been found to be generally satisfactory. After the steeping period the ingredients of part two (as shown in FIGURE 1, the sucrose, salt, and the rest of the water) are, with the first part of ingredients, put into a pressure cooker. As previously indicated, the salt (sodium chloride) can be added as one of the original ingredients, or added to the product at a later time, for example by being dusted onto the end product, or both.

*Cooking the ingredients*

The cooking of the mixture of ingredients of part 1 and part 2 can be done by any one of several pressure cooking methods commonly used in the prior art. For example, a batch process can be used where the ingredients are placed into a cooking chamber defined by a drum which is rotated about a horizontal axis. This drum is equipped with a steam heated jacket and live steam is fed into the cooking chamber of the drum. The batch of ingredients is cooked with a slow rotation of the drum to get agitation of the batch until a thoroughly gelatinized dough is formed. The drum of the cooker is vented periodically during the cooking period to remove air and undesirable volatiles. (This is a standard procedure in processing various cereals for ready-to-eat breakfast food.)

Another possible method is to use a continuous type pressure cooker, where the ingredients are mixed and fed onto a belt which carries the ingredients through a pressurized cooking chamber for the desired length of time. In the continuous pressure cooking process, the relative conditions of time, temperature and pressure are about the same as those indicated above for a batch type process.

The most desirable steam pressure in the cooker is 14 to 20 pounds per square inch gage pressure, with the temperature being about 247° F. to 259° F. Pressure as low as 5 lbs. per square inch can be used without appreciably changing the quality of the end product, but if the ingredients are cooked merely at atmospheric pressure, there is a noticeable loss of quality in the end product. Cooking pressures higher than 14 to 20 pounds per square inch could be used, but in a commercial operation there is no particular advantage in such higher pressures and they are generally less desirable from a cost standpoint.

*Forming the dough*

The cooked mass, at the completion of the cooking step, is quite pliable and at this time it is formed into pieces of the general shape desired for the end product. This is most conveniently done by rolling or extruding the mass into a sheet or sheets and then cutting and forming the sheets into pieces of the desired shape.

As indicated previously, the moisture content of the dough after it leaves the pressure cooker is about 34–36%, based on total weight. According to the processing steps indicated in FIGURE 1, before the dough is sheeted, it is cooled, desirably to a temperature of about 100° to 120° F. The main purpose of so cooling the dough is so that it can more easily be broken down in a hammer mill and fed into sheeting rolls as part of the forming or shaping operation. If, as part of the forming operation, the dough is run through sheeting rolls, it is desirable that one of the rolls be formed with grooves to emboss a pattern of ridges on the dough sheets so formed, for both improved appearance and texture. If instead of using sheeting rolls the dough is extruded into a sheet, it is not necessary to so cool the dough before extruding the same.

The cooling of the dough is conveniently accomplished by spreading the dough over a surface and blowing cold air over or through the same. This cooling process reduces the moisture content of the dough to about 30%, and the pH of the dough at this time will range between about 8.0 to 8.5. The dough, so cooled, is then in a condition where it can easily be formed into pieces of a shape desired for the end product. Various methods and types of apparatus are known and can be devised to form pliable dough into pieces of desired shape, and the particular method or apparatus used is not significant in the present invention.

Drying and tempering the dough pieces

After the dough is formed into snack pieces of the desired shape, these pieces are dried to about 12% moisture. Desirably, this is accomplished by blowing air at about 140° F. through the pieces which are spread over a foraminous carrying surface. The drying time will vary, depending upon such things as the velocity and humidity of the drying air, the depth to which the pieces are spread on the foraminous surface, the thickness of the sheet of material forming the pieces and the configuration of these pieces, and whether the air is blown through or over the pieces. The moisture content to which the pieces are dried can vary between about 10% to 14% and a very good product is still obtained. However, if the moisture content is lowered to below about 9% or is permitted to remain above about 16%, the flavor is not developed to the desired extent, and the product does not puff as well during the subsequent deep frying operation. The temperature at which the drying takes place can be varied within considerable limits. However, this temperature should not be above about 250° F. or else the pieces will become toasted and as a practical matter it should not be so low as to prolong the drying process unnecessarily. It has been found that the best quality of products is obtained by drying at about 140° F. During this drying period, the pH drops to about 7.0 to 7.5, which is evidence of the formation of carbonic acids or other acids resulting from browning reactions of the sugars. This drying step is necessary for proper browning reactions, as the optimum moisture content for browning of sucrose is approximately 10% to 14%. It is during this drying period that the presence of sucrose is especially significant for proper and sufficient browning at this time to develop the proper flavor precursors in the dough pieces. Other sugars such as glucose, lactose, etc., do not have the same qualitative effect as sucrose and would form different flavor precursors.

After the drying of the pieces, there is a tempering period during which the pieces are permitted to stand at room temperature (i.e. about 70° F.) for about a half hour to two hours.

During the first half hour of tempering, the final flavor precursors are developed to the greatest extent, and if the product is deep fried after a half hour of tempering, a very good product can be achieved. However, in a commercial operation there is no particular advantage in attempting to use the shortest possible tempering period, and a tempering period of an hour to two hours has been found to be the most desirable. While the pieces are being tempered, they are kept in a closed chamber so that the moisture content of the pieces remains substantially constant. It is to be expected that the temperature at which satisfactory tempering could be achieved can be varied within moderate limits. However, since in a commercial operation the most practical method is to temper the product at room temperature, experimental excursions into various tempering conditions would be purely academic and serve no practical purpose.

Deep fat frying

At the completion of the tempering period, the product is now ready for the final step of deep fat frying. The best conditions for this frying are with an oil temperature of about 395° to 400° F. and a fry time of from about 10 to 30 seconds, depending upon the thickness of the product. After frying, the product is cooled and ready for packaging. As indicated previously, salt (sodium chloride) can be dusted onto the product at the completion of the frying.

The frying temperature can be varied to some extent (e.g. between about 375° to 410° F.). However, if the frying is done at too low a temperature the product does not puff to the desired extent, while deep fat frying at a higher temperature (e.g. 415° F. to 425° F.) sometimes presents problems because of excessive smoking or flashing of the frying oil, a burned oil flavor in the end product and also problems of instability (i.e. shortened shelf life) of the end product.

The effect of the deep fat frying is to produce a short intense heating and drying of the pieces, with a certain amount of the cooking oil being taken up by the pieces. As is well known in the art, there are other methods of achieving the same general effect of deep fat frying, such as roasting or salt puffing (i.e. surrounding the pieces with hot fluidized salt particles), and then spraying on the oil. In some respects, these other methods can be more advantageous, e.g. in having more control over the fat content of the end product. However, in the present invention such other methods of intensely drying and heating the pieces and applying oil thereto do not produce the full flavor development that is achieved by deep fat frying. And so even though it is within the broader aspects of the present invention to utilize such other methods, the use of deep fat frying has special significance in the present invention.

The following examples serve to disclose the invention in more particularity:

Example I 65 grams of $NaHCO_3$ was mixed with 4 lbs. of water and the resulting solution was then blended with 25 lbs. of Krause No. 131 yellow corn grits. This mixture was permitted to set at room temperature for 45 minutes. One pound of Bakers special sugar (i.e. sucrose) was mixed with 0.2 lb. of salt and with 3 lbs. of water to form a syrup. At the end of the 45-minute period, this syrup and the steeped grits were put in a steam jacketed rotary retort. The jacket and the interior of the retort were filled with steam to a pressure of 20 lbs. per square inch gage. The retort was vented once after 10 minutes and was vented once again 20 minutes later. The ingredients remained in the retort at 20 p.s.i. for a total time of 1 hour. The cooked dough discharged from the retort was cooled and dried slightly to a moisture content of about 30 to 31%. This dough was then sheeted to a thickness of about 0.040 inch, and this sheet was cut into pieces. These pieces were dried at about 140° F. to a moisture content of about 12%, and were held at room temperature at this moisture content for 2 hours. At the end of the 2-hour period, the pieces were fried in vegetable oil at 395° F. for 18 seconds. The fried pieces were then salted. The resultant product was crisp and tender and had an excellent flavor.

Example II

The same process was followed as in Example I, except that 50 grams of $NaHCO_3$ was used instead of 65 grams. The end product had a very good quality comparable to the product made according to Example I, with the only noticeable difference being that the flavor achieved in Example II, although very much the same as in Example I, was slightly bland in comparison therewith.

Example III

The same process was followed as in Example I, except that 80 grams of $NaHCO_3$ was used instead of 65 grams. The end product again had a very good quality comparable to that achieved in Example I, with the only difference being that the flavor achieved in this example, although very much the same as in Example I, was slightly alkaline in comparison therewith.

Example IV

The same procedure was followed as in Example I, except that 50 grams of sodium bicarbonate was used instead of 65 grams, and 1½ pounds of sugar was used instead of 1 pound. The end product was found to be quite desirable, and in comparison with the product of Example I, had generally the same character but was somewhat sweeter and somewhat more bland.

Example V

The same procedure was followed as in Example I, except that 2 pounds of sugar was used instead of 1 pound. A quite desirable product was achieved. The flavor of this product, although generally the same as in Example I, was noticeably sweet in comparison with the product achieved in Example I.

Example VI

The same process was followed as in Example I, except that 75 grams of $KHCO_3$ was used instead of 65 grams of $NaHCO_3$. A highly desirable product was achieved, which seemed nearly identical to the product achieved in Example I.

Example VII

The same process was followed as in Example I, except that 80 grams of $Na_2CO_3$ instead of 65 grams of $NaHCO_3$. The end product was quite desirable, and much the same as that of Example I. The flavor of the product in this example was slightly alkaline in comparison with the product achieved in Example I, but had very much the same character as the flavor of the product of Example I.

Example VIII

The same process was followed as in Example I, but 106 grams of $K_2CO_3$ was used instead of 65 grams of $NaHCO_3$. The resulting product was quite desirable and was much the same as that of Example I. The flavor of the product in this example had the same character as the flavor of the product of Example I, but was slightly bland in comparison therewith.

Example IX

The same process was followed as in Example I, except that 127 grams of $Na_3PO_4$ was used instead of 65 grams of $NaHCO_3$. The resulting product was much the same as, and comparable to, that achieved in Example I, but the flavor of the product of this example, although having much the same character as that of Example I, was somewhat bland in comparison therewith.

Example X

The same process was followed as in Example I, except that the dough taken from the retort was not cooled but was placed directly in an auger extruder to be formed into a sheet. This sheet was then cut into pieces, dried, tempered and then fried as in Example I. The flavor and texture of the end product were comparable to that achieved in Example I.

Example XI

A product was made in accordance with the procedure outlined in Example I, but the end product was not salted. This product was almost identical to the salted product of Example I, but it was slightly lacking in the full rounded flavor of Example I.

For purposes of comparison a product was made according to the procedure of Example I, except that 35 grams of NaOH was used rather than 65 grams of $NaHCO_3$. The flavor of the resulting product was of a character quite different from that of the product made according to Examples I through XI, and was not a desirable flavor.

For further comparison, the same process was followed as in Example I, but sugar was left out entirely as an ingredient. The resulting product had very little flavor development and was not desirable to eat.

It should be understood that the foregoing is merely illustrative of certain embodiments of the invention and many variations may be made by those skilled in the art without departing from the spirit and scope of the invention.

Now therefore I claim:

1. A process for making a food product, said process comprising:
    (a) cooking a mixture of corn, sucrose, water and a flavor developing ingredient selected from the group consisting of $NaHCO_3$, $KHCO_3$, $K_2CO_3$, $Na_2CO_3$, $Na_3PO_4$ and mixtures thereof, to form a workable gelatinized dough, the moisture content of said dough being at least 30%,
    (b) shaping said dough into a desired configuration,
    (c) drying said dough to a temperature suitable for frying and to a moisture content ranging from about 9–16%, and
    (d) frying said dough, the ratio of sucrose to corn being from about one-half pound to two pounds of sucrose per 25 pounds of corn.

2. The process as recited in claim 1, wherein prior to the cooking of said mixture, said corn is wetted with a solution of at least a portion of said water and said flavor developing ingredient.

3. The process as recited in claim 2, wherein said water and said flavor developing ingredient are mixed to form a solution, which solution is blended with said corn, which after said blending is permitted to stand for at least about a half hour prior to cooking.

4. The process as recited in claim 1, wherein subsequent to the cooking of said mixture but before the frying, said dough is subjected to a maturing and tempering period of at least about a half hour to develop proper flavor precursors in said dough.

5. The process as recited in claim 4, wherein said dough is dried to about 9 to 16% moisture content and then subjected to said tempering and maturing period.

6. The process as recited in claim 4, wherein prior to cooking of said mixture, said corn is wetted with a solution of at least a portion of said water and said flavor developing ingredient.

7. The process as recited in claim 1, wherein the ratio of said flavor developing ingredient to said corn is about 0.4 to 1.2 gram moles of flavor developing ingredient to 25 pounds of corn.

8. The process as recited in claim 1, wherein the ratio of said flavor developing ingredient to said corn is about 0.6 to 1.0 gram moles of flavor developing ingredient to 25 pounds of corn.

9. The process as recited in claim 1, wherein said cooking is done in the presence of steam at a pressure of at least about 5 pounds per square inch.

10. The process as recited in claim 1, wherein said cooking is done in the presence of steam at a pressure of about 14 to 20 pounds per square inch.

11. The process as recited in claim 1, wherein said workable gelatinized dough is formed into a sheet-like configuration and then made into pieces of the desired shape which are then dried and fried.

12. A process for making a food product, said process comprising:
    (a) blending with corn a solution of water and a flavor developing ingredient selected from the group consisting of $NaHCO_3$, $KHCO_3$, $K_2CO_3$, $Na_2CO_3$, $Na_3CO_4$ and mixtures thereof,
    (b) permitting said corn to stand for about one-half hour until said corn is well wetted with said solution,
    (c) adding sucrose to said corn, the ratio of sucrose to corn being from about one-half pound to two pounds of sucrose per 25 pounds of corn, (d) cooking the resulting mixture in the presence of steam at a pressure of at least about 5 pounds per square inch, until a workable gelatinized dough is formed, the moisture content of said dough being about 34–36%,
(e) forming said dough into pieces of a desired shape for the food product,
(f) drying said pieces to about 9 to 16% moisture content,
(g) subjecting said dried pieces to a tempering and maturing period, which is at least about a half hour in length, and
(h) frying said pieces.

13. A corn snack product comprising a cooked food piece formed from corn grits, sucrose, and a flavor developing agent selected from the group consisting of $NaHCO_3$, $KHCO_3$, $K_2CO_3$, $Na_2CO_3$, $Na_3PO_4$, and mixtures thereof, the proportions of said flavor developing agent to said corn grits being about 0.4 to 1.2 gram moles to 25 pounds, and the proportion of said sucrose to said corn grits being about 0.5 to 2.0 pounds to 25 pounds.

14. The product of claim 13 wherein the product includes salt.

15. The product of claim 13 wherein it contains 65 grams of $NaHCO_3$ and 1 pound of sucrose per 25 pounds of corn grits.

16. The product of claim 13 wherein it contains 77 grams of $KHCO_3$ and 1 pound of sucrose per 25 pounds of corn grits.

17. The product of claim 13 wherein the product includes cooking oil and salt.

18. A process for making a food product, said process comprising:
(a) cooking a mixture of corn, sucrose, water and a flavor developing ingredient selected from the group consisting of $NaHCO_3$, $KHCO_3$, $K_2CO_3$, $Na_2CO_3$, $Na_3PO_4$ and mixtures thereof, to form a workable gelatinized dough, the moisture content of said dough being at least 30%,
(b) shaping said dough into a desired configuration,
(c) drying said dough to a temperature suitable for frying and to a moisture content ranging from about 9–16%, and
(d) frying said dough,
(e) the ratio of said flavor developing ingredients to said corn being about 0.4 to 1.2 gram moles of flavor developing ingredient to 25 pounds of corn, and the ratio of sucrose to said corn being about one-half pound to two pounds of sucrose to 25 pounds of corn.

References Cited

UNITED STATES PATENTS

| | | | |
|---|---|---|---|
| 2,905,559 | 9/1959 | Anderson et al. | 99—80 |
| 3,083,103 | 3/1963 | Anderson et al. | 99—80 |
| 3,194,664 | 7/1965 | Eytinge | 99—80 |
| 3,278,311 | 10/1966 | Brown et al. | 99—80 |

RAYMOND N. JONES, *Primary Examiner.*